US012633280B2

(12) United States Patent
Wacks et al.

(10) Patent No.: US 12,633,280 B2
(45) Date of Patent: May 19, 2026

(54) AUTOMATIC PARAMETER TUNING FOR ACTIVE ROAD NOISE CANCELLATION

(71) Applicant: Analog Devices, Inc., Wilmington, MA (US)

(72) Inventors: Steven A Wacks, Natick, MA (US); Alan Christopher O'Connor, Dedham, MA (US)

(73) Assignee: Analog Devices, Inc., Wilmington, MA (US)

( * ) Notice: Subject to any disclaimer, the term of this patent is extended or adjusted under 35 U.S.C. 154(b) by 129 days.

(21) Appl. No.: 18/616,011

(22) Filed: Mar. 25, 2024

(65) Prior Publication Data

US 2025/0299665 A1 Sep. 25, 2025

(51) Int. Cl.
*G10K 11/178* (2006.01)

(52) U.S. Cl.
CPC .. *G10K 11/17854* (2018.01); *G10K 11/17881* (2018.01); *G10K 2210/12821* (2013.01)

(58) Field of Classification Search
CPC ... G10K 2210/3024; G10K 2210/3038; G10K 2210/3052
See application file for complete search history.

(56) References Cited

U.S. PATENT DOCUMENTS

| | | | | |
|---|---|---|---|---|
| 10,347,236 | B1 * | 7/2019 | Bastyr | G10K 11/17823 |
| 2013/0156213 | A1 | 6/2013 | Pan et al. | |
| 2016/0314778 | A1 * | 10/2016 | Christoph | G10K 11/17854 |
| 2023/0197052 | A1 | 6/2023 | Cho et al. | |

FOREIGN PATENT DOCUMENTS

| | | |
|---|---|---|
| CN | 115482803 | 12/2022 |

OTHER PUBLICATIONS

"European Application Serial No. 25165813.4, Extended European Search Report mailed Aug. 6, 2025", 9 pgs.
"Automatic Differentiation with torch.autograd—PyTorch Tutorials 2.7.0+cu126 documentation", Pytorch, [Online] Retrieved from the internet: <https://docs.pytorch.org/tutorials/beginner/basics/autogradqstutorial.html>, (Jan. 16, 2024), 4 pgs.

* cited by examiner

*Primary Examiner* — Ping Lee
(74) *Attorney, Agent, or Firm* — Schwegman Lundberg & Woessner, P.A.

(57) ABSTRACT

Techniques for automatic parameter tuning of active road noise cancellation systems are described herein. The system can automatically search for an optimal set of algorithm parameters based on recorded data. An active road noise cancellation algorithm and simulation can be embedded in an auto-differentiation framework, which allows gradients of the algorithm parameters to guide the automatic search and calculations of the algorithm parameters.

15 Claims, 8 Drawing Sheets

AUTOMATIC PARAMETER TUNING FOR ACTIVE ROAD NOISE CANCELLATION

TECHNICAL FIELD

The present disclosure generally relates to parameter tuning of noise cancellation systems, in particular active noise cancellation for vehicles.

BACKGROUND

Noise in vehicle cabins can be problematic as it can cause driver fatigue as well as impede entertainment and voice-controlled devices. Vehicle cabin noise can be more pronounced in electric vehicles because electric vehicles do not have an engine to mask some of the noise.

Noise cancellation (also referred to as road noise cancellation) can suppress noise in a vehicle cabin using certain filtering techniques. Conventional active road noise cancellation systems typically include a set of parameters that must be properly tuned prior to installation for optimal performance. These parameters, which are different from filter coefficients/taps that are dynamically changed in real time to account for current road noise conditions, are typically manually tuned, which requires a significant amount of time, resources, and expertise.

SUMMARY

Disclosed herein is a method to automatically set tunable parameter values of a road noise cancellation system, the method comprising: providing a software simulation of the road noise cancellation system, the road noise cancellation system including a plurality of tunable parameters; receiving one or more recorded logs representing one or more different driving conditions of a test vehicle; setting a first set of values for the plurality of tunable parameters; simulating the road noise cancellation system using the software simulation based on the one or more recorded logs and the first set of values for the plurality of tunable parameters to generate simulation results; and setting a second set of values for the plurality of tunable parameters based on the simulation results.

Also, disclosed herein is a system to automatically set tunable parameter values of a road noise cancellation system. The system comprising one or more processors of a machine, and a memory storing instructions that, when executed by the one or more processors, cause the machine to perform operations: providing a software simulation of the road noise cancellation system, the road noise cancellation system including a plurality of tunable parameters; receiving one or more recorded logs representing one or more different driving conditions of a test vehicle; setting a first set of values for the plurality of tunable parameters; simulating the road noise cancellation system using the software simulation based on the one or more recorded logs and the first set of values for the plurality of tunable parameters to generate simulation results; and setting a second set of values for the plurality of tunable parameters based on the simulation results.

Further, disclosed herein is a machine-readable storage medium embodying instructions that, when executed by a machine, cause the machine to perform operations: providing a software simulation of the road noise cancellation system, the road noise cancellation system including a plurality of tunable parameters; receiving one or more recorded logs representing one or more different driving conditions of a test vehicle; setting a first set of values for the plurality of tunable parameters; simulating the road noise cancellation system using the software simulation based on the one or more recorded logs and the first set of values for the plurality of tunable parameters to generate simulation results; and setting a second set of values for the plurality of tunable parameters based on the simulation results.

BRIEF DESCRIPTION OF THE DRAWINGS

Various ones of the appended drawings merely illustrate example embodiments of the present disclosure and should not be considered as limiting its scope.

DETAILED DESCRIPTION

Improved techniques for automatic parameter tuning of active road noise cancellation systems are described herein. The techniques use a set of recorded data that can be specific to a vehicle model type. The system, as described herein, can automatically search for an optimal set of algorithm parameters based on the recorded data. An active road noise cancellation algorithm and simulation can be embedded in an auto-differentiation framework, which allows gradients of the algorithm parameters to guide the automatic search and calculations of the algorithm parameters. After determining the set of algorithm parameters based on the gradient-based optimization techniques, the active road noise cancellation system can be configured to be used in a vehicle. The active road noise cancellation system can use the optimal set of algorithm parameters in operation.

Figure 1:
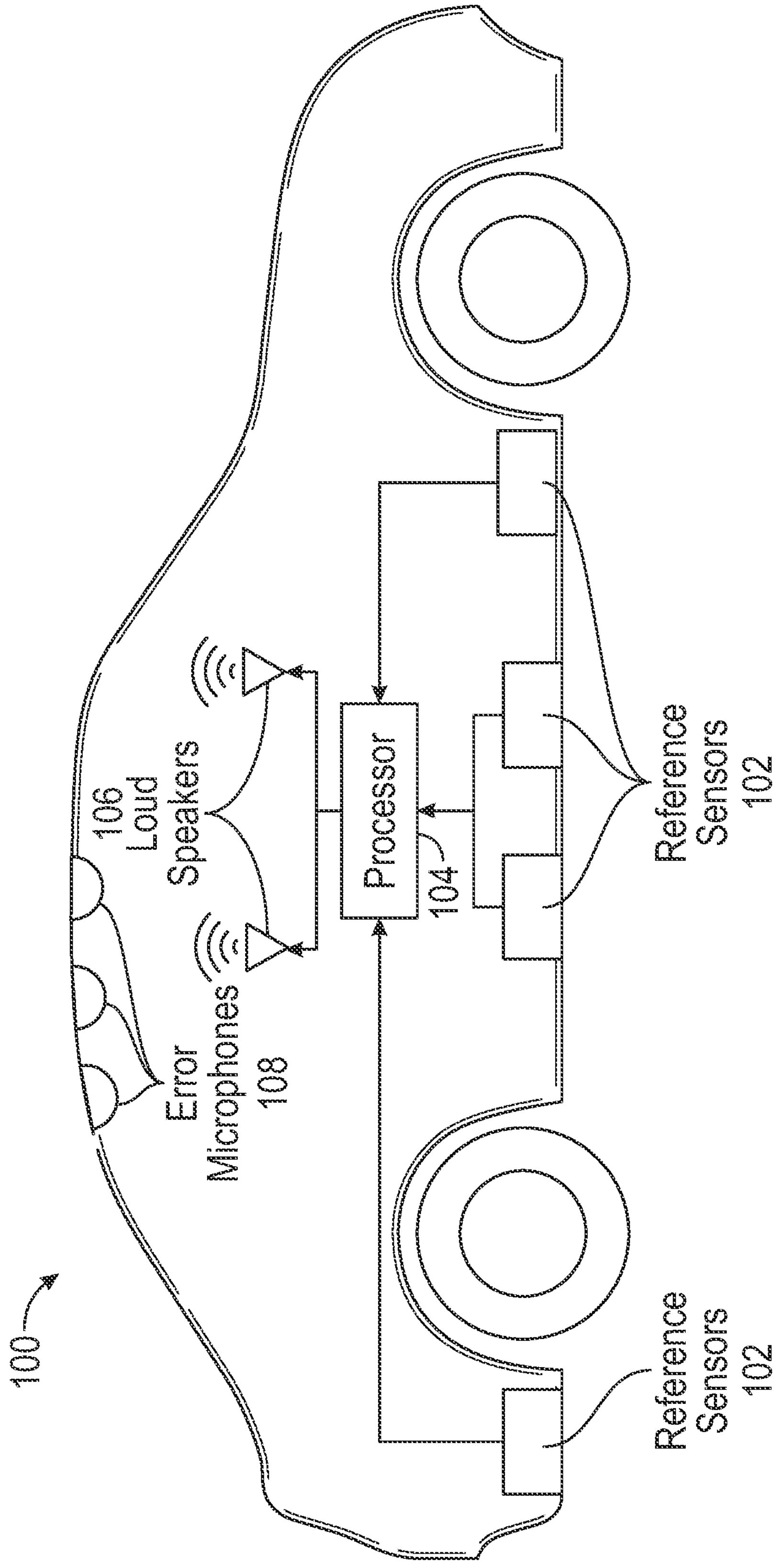
FIG. 1 illustrates a block diagram of example portions of an active noise cancellation system.

FIG. 1 illustrates a block diagram of example portions of an active noise cancellation system 100 (also referred to as active road noise cancellation system). The active noise cancellation system 100 can be provided inside a vehicle as shown. The active noise cancellation system 100 includes a plurality of reference sensors 102, a processor 104 (e.g., digital signal processor (DSP)), a plurality of loudspeakers 106, and a plurality of error microphones 108.

The reference sensors 102 may be provided as accelerometers placed near the wheels of the vehicle. The reference sensors 102 can sense vibrations that may be correlated with the road noise that passes into the vehicle cabin. In some embodiments, four reference sensors 102 may be provided, one reference sensor (e.g., accelerometers) for each wheel of the vehicle. In some examples, each reference sensor 102 may include three axes, generating twelve channels of reference signals.

The processor 104 may be provided as one or more microprocessors, such as digital signal processors (DSPs). The processor 104 may receive the reference signals from the reference sensors 102 and may generate an anti-noise signal based on the reference signals. The anti-noise signal may be 180° out of phase with the detected noise waves from the reference signals so that the anti-noise signal destructively interferes with the detected noise waves to cancel the noise in the vehicle cabin. The anti-noise signal may be transmitted to the loudspeakers 106, which may output the anti-noise signal. The error microphones 108 may detect the noise level in the vehicle and may transmit information to the processor 104 in a feedback loop to modify the noise cancellation accordingly.

In some examples, the processor 104 may utilize an adaptive RNC algorithm, such as a Filtered-Reference Least Mean Squared (FxLMS) algorithm, to generate the anti-noise signal to play out the loudspeakers 106. The RNC algorithm typically includes a plurality of tunable parameters, which are tuned prior to installation. Examples of the tunable parameters include step size for adaptation (also referred to as mu), leakage factor used as a forgetting factor, and a number of taps corresponding to a length of the adaptive filter. These tunable parameters affect the performance of the RNC algorithm, for example in its ability to adapt to changes in road condition.

When an RNC system is designed for a new vehicle model or vehicle type, certain aspects of the RNC system software may be configured in a way that is particularized to the vehicle model or type, such as the values of the tunable parameters. Although the RNC system incorporates an adaptive algorithm, the adaptive algorithm may be unable to adapt to all possible situations without a proper tuning and configuration before installation. Tuning is an engineering process distinct from the adaptation that occurs as part of the normal, continuous operation of each vehicle equipped with an RNC system.

Figure 2:
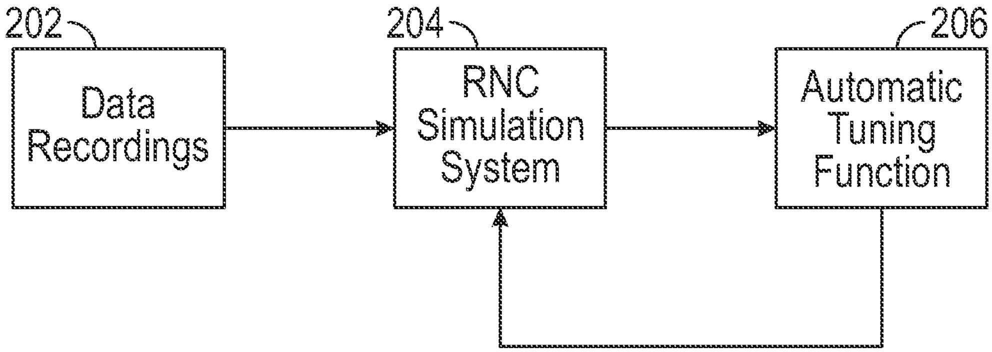
FIG. 2 illustrates a block diagram of example portions of parameter tuning framework.

FIG. 2 illustrates a block diagram of example portions of parameter tuning framework 200. The parameter tuning framework 200 includes data recordings 202, a RNC simulation system 204, and an automatic tuning function 206. The data recordings 202 may include a set of recordings of data from reference sensors and error microphones generated in a target vehicle type under different driving conditions. Driving conditions can refer to a variety of different environments and/or vehicle configurations, such as driving on different roadway surfaces or driving speeds, driving in electric-only or engine-only or hybrid mode for vehicles so equipped, or with different vehicle configurations (e.g., sunshade stored or deployed) or seat positions or passenger occupancy, or other loading of the vehicle, such as with luggage, or other factors that may affect RNC performance within a vehicle model including extreme events, such as rock strikes near reference sensors or taps on in-cabin microphones. For example, a test vehicle, which is representative of the vehicle model or type, may be driven in different environments while data from reference sensors 102 and error microphones 108 is recorded. The processor 104 running the RNC algorithm may be turned off during the recording so that only driving condition signals (e.g., vibrations, noise) are captured without an anti-noise signal.

The data recordings 202 may include reference data from the reference sensors and disturbance data from the error microphones. In some examples, additional reference sensors and error microphones may be used in the target vehicle for the data recordings 202. For example, additional microphones may be used to monitor acoustic performance at various places within the cabin in addition to the microphone positions to be used in mass production.

The RNC simulation system 204 may include a software simulation of the RNC system installed in the target vehicle. The software simulation of the RNC system may include the RNC algorithm and an acoustic model of the vehicle cabin. For example, a calibrated model of transfer functions between respective amplifier input used for road noise cancellation and respective microphone sensor may be included in the software simulation.

The automatic tuning function 206 may adjust the tunable parameters of the RNC system using a fully automated search strategy to improve a quantitative measure of RNC performance. The quantitative measure of the RNC performance can match the subjective preferences of an expert human tuner so that a human tuner may not be involved in the fully automated search.

Based on the on-road recordings of the reference sensors (e.g., accelerometers) and microphones, a model for the acoustic channel from loudspeakers to error microphones, an RNC algorithm, and a set of RNC algorithm parameters, the parameter tuning framework 200 can simulate the residual noise signal present at the error microphones. The residual noise at the error microphones can be represented by:

$$e_m[n], m=1 \ldots M,$$

where M is the number of microphones.

Next, a quantitative measure Q of performance of the RNC system can be constructed that captures the preferences of the expert human tuner. One example measure of performance is the average residual power at those microphones placed in the desired quiet zones within the vehicle:

$$Q = \frac{1}{MN} \sum_{m=1}^{M} \sum_{n=}^{N} (e_m[n])^2$$

Since em[n] is the result of the whole RNC simulation across the duration of the acquired data recordings from the target vehicle, it can be seen that Q depends on the driving scenario and vehicle through the recorded data, and also depends on the choice of RNC algorithm and the settings of the tunable RNC algorithm parameters θ. Thus, Q(θ;x,d) can be written to indicate these dependencies.

Alternatively or additionally, the performance metric can emphasize the importance of noise reduction at certain positions with respect to other positions, by providing separate weights for the residual error at each microphone, which for example can be represented by:

$$Q = \frac{1}{MN} \sum_{m=1}^{M} \lambda_m \sum_{n=}^{N} (e_m[n])^2$$

where λm is a non-negative weighting factor for microphone m.

Alternatively or additionally, the system can select a quantitative measure of performance that evaluates how much the noise is reduced in certain ranges of frequencies, for example those frequencies where the target vehicle has problematic noises, such as tire cavity resonance or body impact boom.

Figure 3:
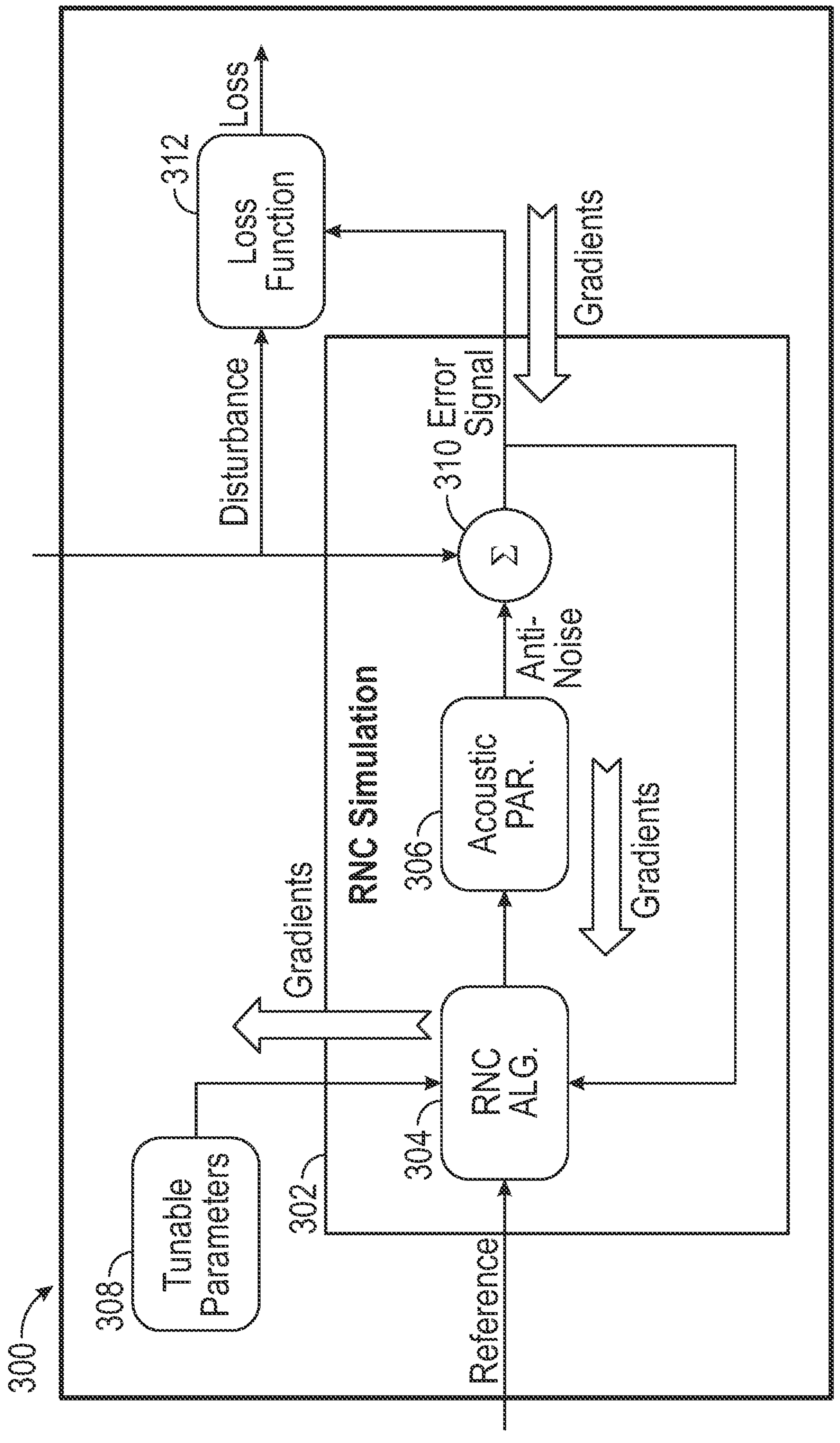
FIG. 3 illustrates a block diagram of example portions of an automatic parameter tuning system.

FIG. 3 illustrates a block diagram of example portions of an automatic parameter tuning system 300. The automatic parameter tuning system 300 includes a RNC simulation 302 with an RNC algorithm 304 and acoustic parameters 306 representative of the acoustic environment of the vehicle cabin and tunable parameters 308.

The RNC algorithm 304 can be an adaptive algorithm, such as a Filtered Least Mean Squared (FxLMS) algorithm. The adaptive algorithm can include adjustable coefficients/taps that are dynamically adjusted in operation to account for observed road conditions, which are different from the tunable parameters 308. The tunable parameters 308 may include a plurality of parameters that are tuned prior to installation in the target vehicle using the techniques described herein. Examples of tunable parameters 308 may include step size and leakage values. The RNC algorithm can generate an RNC output signal.

The RNC simulation 302 receives reference signals from data recordings as an input. The reference signals may correspond to signals captured by reference sensors in the data recordings, as described above. The RNC simulation 302 may run RNC simulation operations based on the reference signals and may generate an anti-noise signal. The anti-noise signal may be combined with a disturbance signal using a summer 310. The disturbance signal may correspond to signals captured by error microphones in the data recordings, as described above. The output of the summer 310 is an error signal. The error signal may represent the residual error after the anti-noise signal destructively interferes with the disturbance signal.

A loss function 312 may receive the error signals, the disturbance signals, and the anti-noise signals (including the RNC output signal) and generate a loss signal. The loss signal 312 can be identified as the optimization target for an optimization algorithm (such as stochastic gradient descent or ADAM), which will propose values for the tunable parameters to attempt to reduce the loss signal. The optimization algorithm may generate and use automatically-computed gradients of the loss signal with respect to the tunable parameters 308 (i.e., parameter gradients) to determine the next proposed values for the tunable parameters. Parameter gradients indicate where the search procedure should travel in the parameter space to reduce the loss signal. The gradients are back propagated to the different blocks of the automatic parameter tuning system 300 to generate optimized tunable parameter values based on the gradient values of the performance metric of the loss signal. The automatic parameter tuning system 300 may operate in an iterative matter to determine the parameter values until the performance metric reaches a specified value.

Figure 4:
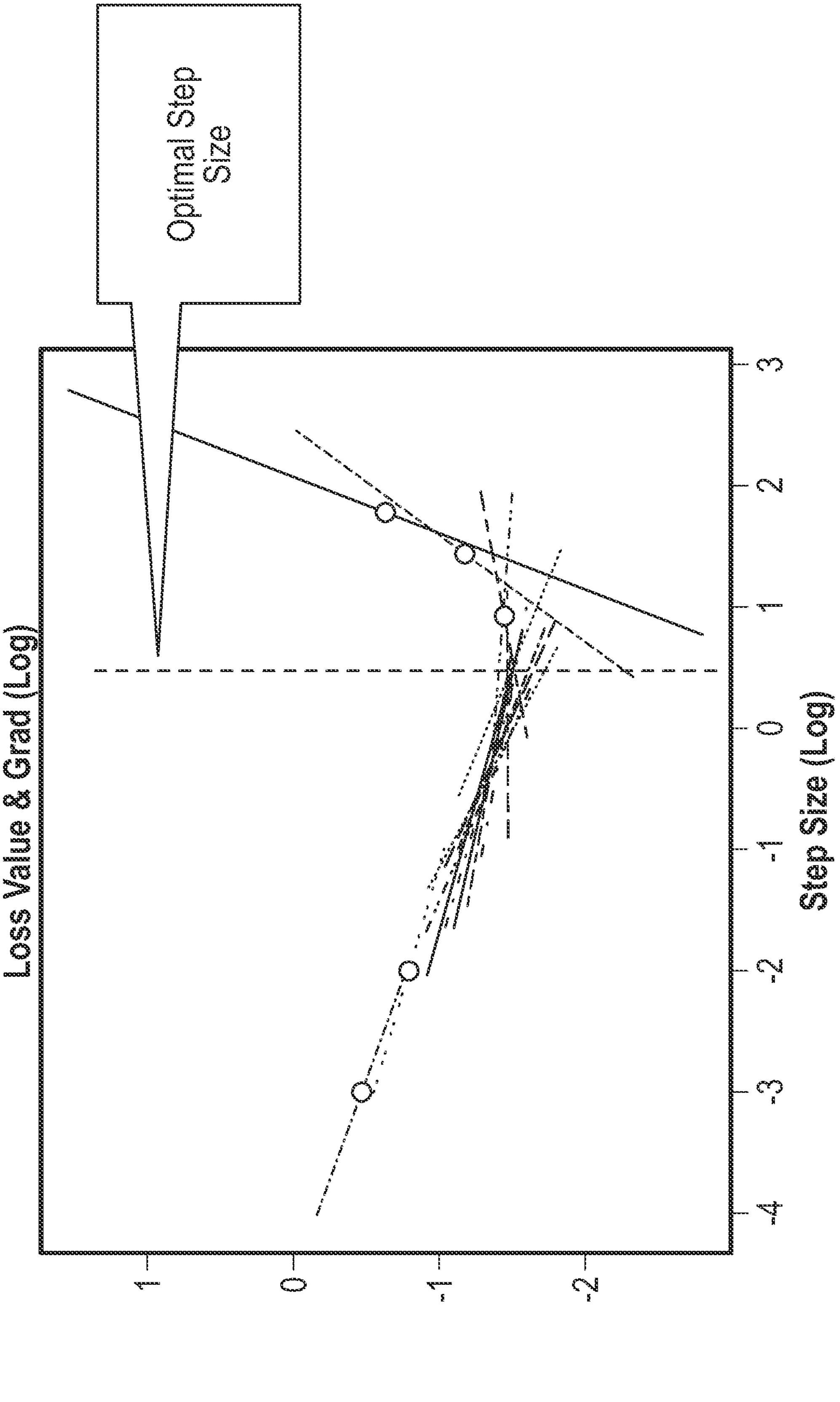
FIG. 4 illustrates an example of a parameter gradient search for a step size parameter.

FIG. 4 illustrates an example of a parameter gradient search for a step size parameter. The objective "loss" function (a type of quantitative measure of quality) is minimized based on the gradient search. Lower values of the loss function (e.g., average residual noise level after cancellation) indicate better performance. In some examples, more complicated loss functions (e.g., frequency shaping, psychoacoustic modes) can also be used. As shown, the parameters are determined using gradient descent optimization. FIG. 4 shows a 1D example demonstrating how the gradients indicate the loss surface shape on a logarithmic scale. Tangent lines depict the gradients and guide the search. FIG. 4 shows the optimal step size in this example.

Figure 5A:
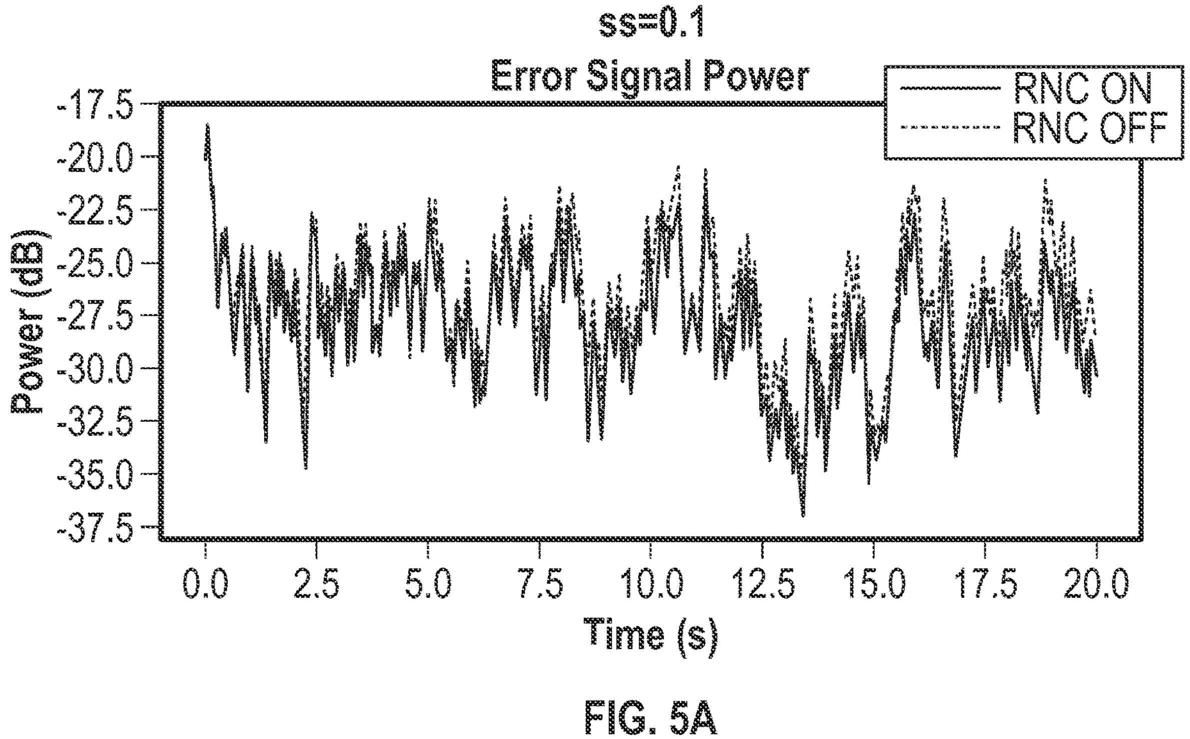
FIGS. 5A-5C show examples of RNC performance using different step sizes.
Figure 5B:
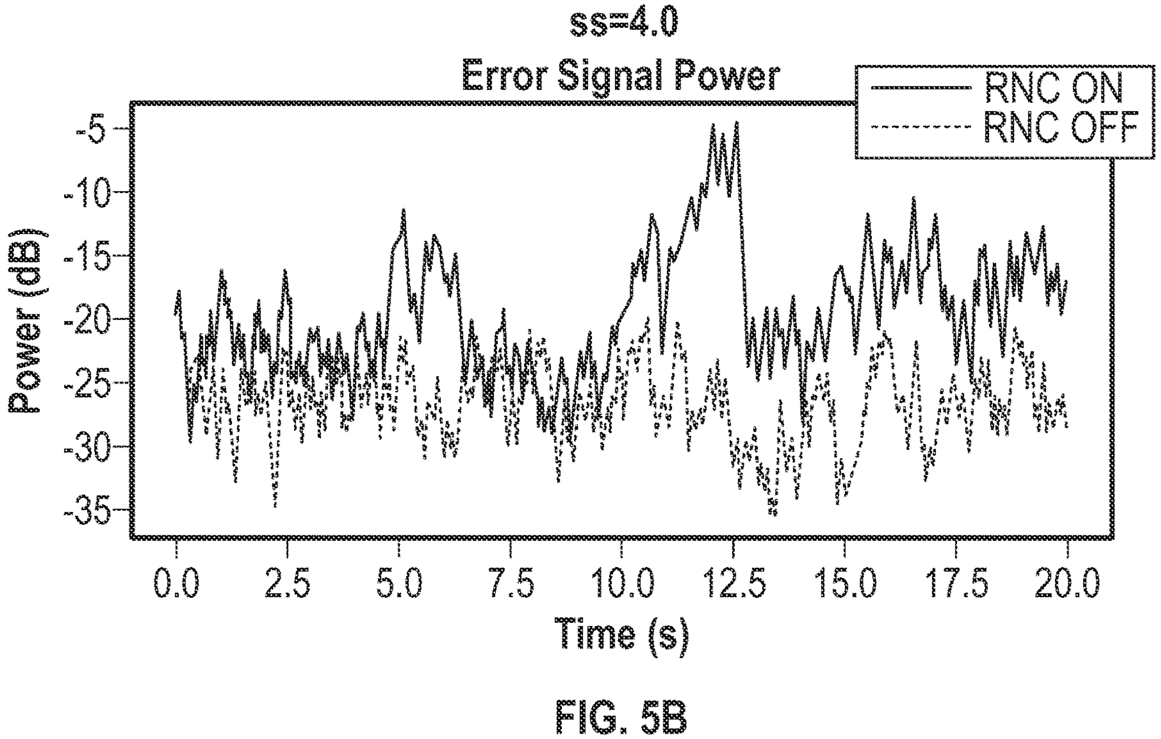
Figure 5C:
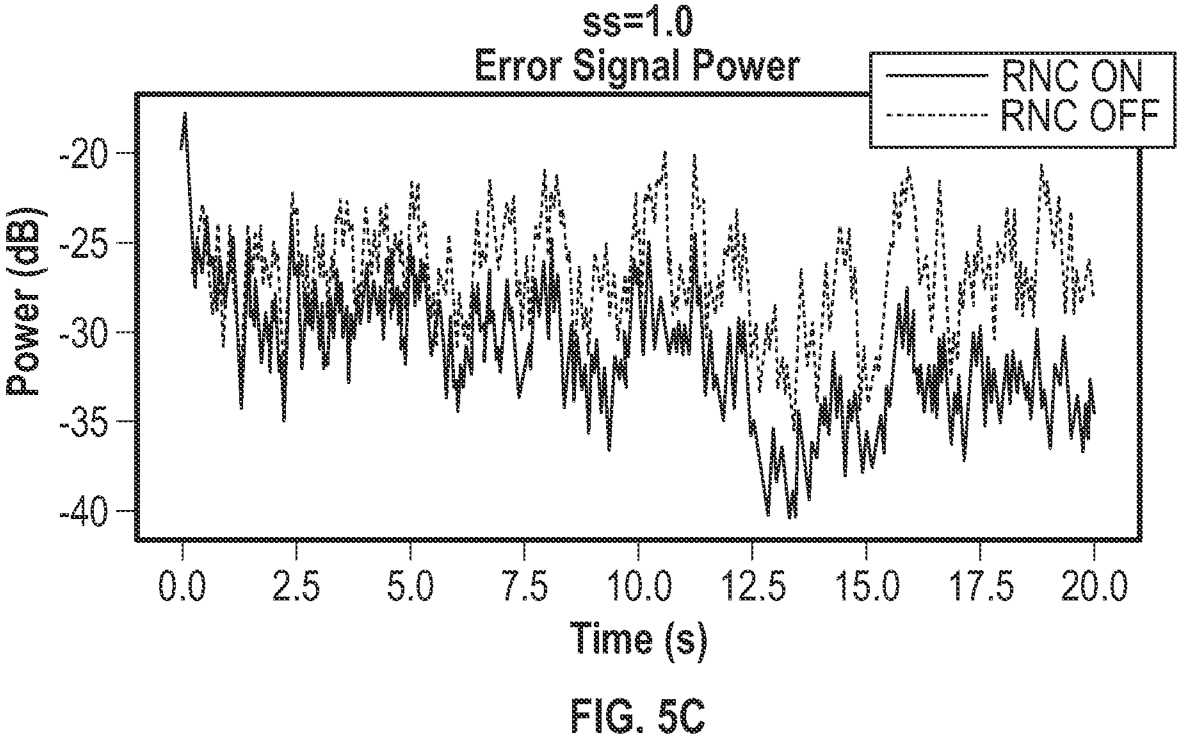

FIGS. 5A-5C show examples of RNC performance using different step sizes. Step size is an example of a tunable parameter and affects how rapidly the RNC system can respond to new road conditions. FIGS. 5A-5C show the raw disturbance level (labeled RNC OFF) and disturbance level plus anti-noise (labeled RNC ON). The vertical scale of each plot is sound power. FIG. 5A shows the system behavior with a step size of 0.1. The step size 0.1 may considered too small because the system is too slow to learn the new conditions. FIG. 5B shows a step size of 4.0. The step size 4.0 may be considered too large because the system may become unstable. FIG. 5C shows an optimal step size 1.0, which can be determined using gradient-based parameter tuning techniques described herein.

Figure 6:
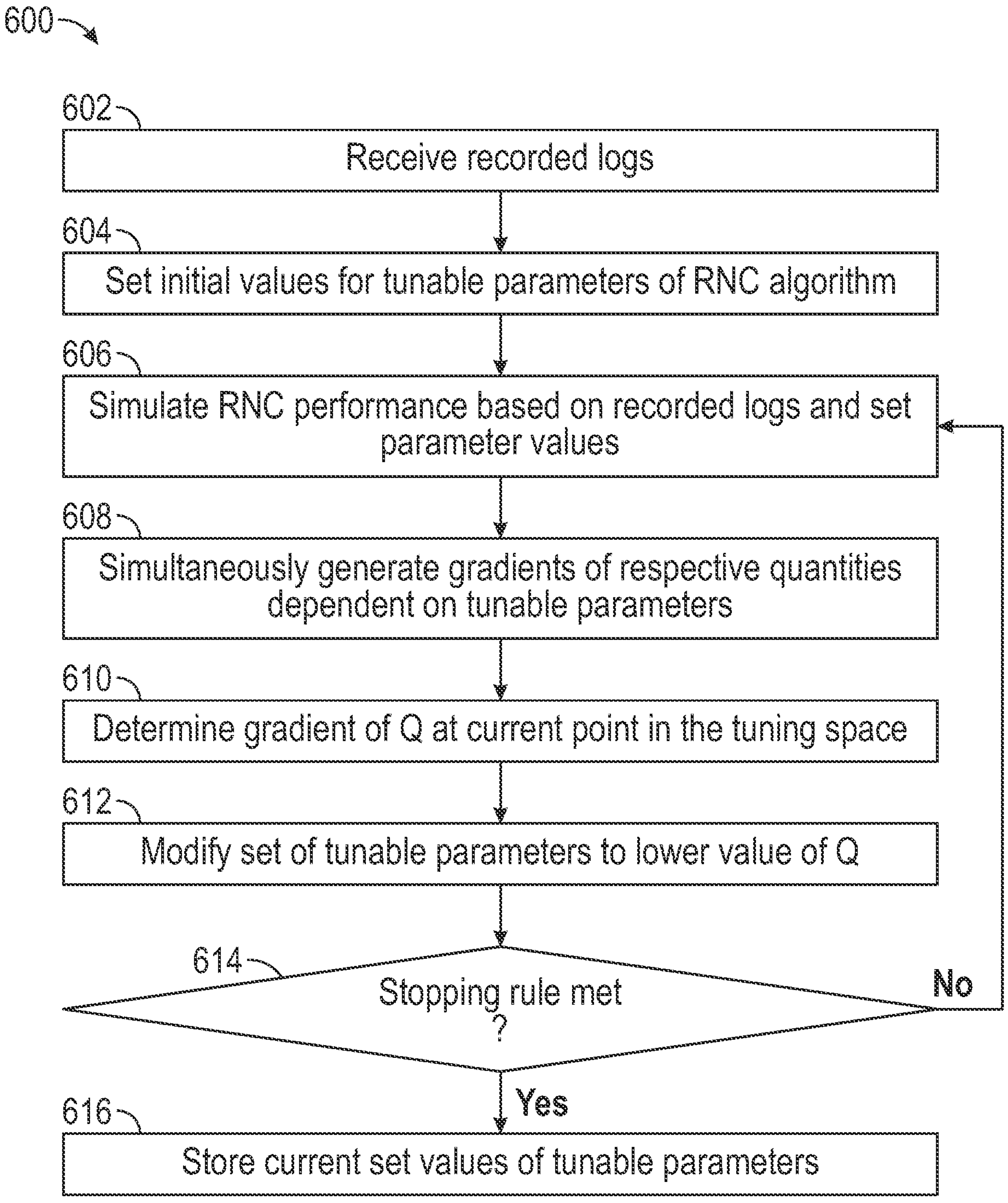
FIG. 6 illustrates a flow diagram for a method for automatic parameter tuning.

FIG. 6 illustrates a flow diagram for a method 600 for automatic parameter tuning. At operation 602, the system receives recorded logs (e.g., data recordings 202) for a target vehicle type under one or more different driving condition, as described above. The recorded logs may include reference data from the reference sensors and disturbance data from the error microphones, as described above.

At operation 604, the system sets initial values for the tunable parameters of the RNC algorithm (θ[0]). For example, the initial values can be set to be halfway between the minimum and maximum allowed values for each parameter.

At operation 606, the system simulates RNC performance on the recorded logs and the set values of the tunable parameters.

At operation 608, the system simultaneously or concurrently generates gradients of respective quantities that depend on the tunable parameters. In some examples, the system may perform the simulation and forward-mode auto-differentiation to generate the gradients in sync. For example, the system may be instructed that the tunable parameters are quantities whose gradients are to be propagated in sync with simulation.

At operation 610, the system determines the gradient of the quantitative measure (Q) at the current point in the tuning space, which can be represented as:

$$\nabla\theta Q(\theta[k];x,d)$$

At operation 612, the system modifies the set of tunable parameters to attempt to lower the value of Q. For example, the system can modify the tunable parameters according to:

$$\theta[k+1]=\theta[k]-\alpha\nabla\theta Q(\theta k;\,x,\,d),$$

where α is a learning-rate. So long as α is small enough, the new parameters θ[k+1] used in the next simulation will yield a lower value of Q than θ[k].

At operation 614, the system checks if a stopping rule is met. For example, a stopping rule may include whether the norm of the gradient of the quantitative measure (∇θQ) becomes sufficiently small, such as below a threshold. Another stopping rule may include whether the simulated value of the quantitative measure (Q) reaches an acceptable level of performance, such as based on a Q threshold. Another stopping rule may include whether the total tuning time elapsed has exceeded a time limit.

At operation 616, if at least one stopping rule is met, the system may store the current set values of the tunable parameters and end the method 600. However, if no stopping rule is met, the system may return to operation 606 and may iteratively perform the specified operations until at least one stopping rule is met.

As described above, at each step of the iterative tuning, the adjustment of the tunable parameters can be proportional to the most recent gradient computation. In some examples, a history of gradient values and optimization trajectory using constructs, such as momentum or adaptive step sizes (e.g., these may be included in operation 612 above), may be able to cross regions of the parameter space where gradients decrease more quickly while maintaining stability when the gradients are large in norm.

Generating gradients of complicated functions (such as a FxLMS) can use the "Chain Rule," which states that if a function is a composition of the form (z=f(g(x)), which is to say, z=f(y) and y=g(x)), then the derivatives obey:

$$\frac{dz}{dx} = \frac{df}{dy} \cdot \frac{dg}{dx}$$

Notably, the behavior of the RNC simulation can be represented as a differentiable function of the tunable parameters. For example, in a discrete-time simulation of a RNC system, at any sample instant, the residual error at the microphones em[n] is the sum of the disturbance signal dm[n] plus the anti-noise contribution ym[n]:

$$e_m[n] = d_m[n] + y_m[n]$$

In turn, the anti-noise contribution at microphone m is a linear function of past reference samples ($x_j$[n]) and of the current state of the adaptive filter coefficients (wkj):

$$y_m[n] = \sum_k g_{mk} * \sum_j w_{kj} * x_j$$

The values of the adaptive filter coefficients wkj can be differentiable functions of the past data samples, the past states of those filters, and the tunable algorithm parameters θ.

Thus, the residual noise can be represented as a function of the algorithm parameter vector and of the recorded data:

$$e_m[n]=F_m(\theta;x_j,d_m)$$

As mentioned above, $F_m$ can be differentiable with respect to the tunable algorithm parameters θ. Hence, the system can select a quantitative measure of performance Q that is also a differentiable function of the waveforms produced by the simulation. The overall composition of functions can be a differentiable function of the parameters θ:

$$Q(e_m)=Q(F_m(\theta;x_j,d_m))$$

In practice, the vector of tunable RNC parameters may comprise a hundred or more individual parameters and the data recordings may comprise millions of samples. Software libraries for machine learning (e.g., PyTorch) may be used to simultaneously compute the specified operations of a machine learning model and the derivatives of those operations with respect to their inputs. These machine learning software libraries can also provide routines to automatically compute the end-to-end gradient of a complex algorithm (not necessarily a machine learning model) by combining the derivatives of the primitive operations that compose the algorithm, for example according to the Chain Rule.

Also, machine learning software libraries include optimization routines implementing algorithms such as stochastic gradient descent or ADAM that can use the computed gradients to iteratively improve a quantitative performance metric. Applying these techniques, the RNC simulation, including the simulation of any adaptive algorithms such as FxLMS and the acoustic channel within the vehicle, can be coded using a software library providing an auto-differentiation capability, and the RNC algorithm simulation and quantitative performance metric can be constructed using operations that are themselves differentiable. Therefore, the routines provided by the machine learning software library can be used for automatic computation of the gradient for each tunable parameter of the RNC system as described herein.

In some examples, convexification can be utilized for tuning discrete values in an RNC algorithm in a gradient-based auto-tuning approach. For example, some adjustable parameters of the RNC algorithm may be provided as discrete values, such as the length (in discrete-time samples) of the adaptive filters used within the RNC algorithm. The gradient-based auto-tuning approach can be used for these discrete values by way of convexification.

For example, consider that the system seeks to determine what level of performance would be achieved with an adaptive filter length of L=99.5 samples. This value cannot be realized in practice. However, the system can run the simulation twice, once with filter length equal to 99 and second simulation run with filter length equal to 100. The system can assign the performance metric to be Q(L=99.5)=0.5*Q(L=99)+0.5*Q(L=100), that is, halfway between the values achieved by lengths of 99 and 100. Similarly, any other point in between 99 and 100 can be evaluated by weighting it according to:

$$Q(L) = (1-(L-99)) * Q(99) + (L-99) * Q(100)$$

In this case, the performance function Q can be differentiable at every point between the integer values, and specifically, within this range, the derivative would be $\partial L \partial Q = Q(100) - Q(99)$. Stochastic gradient descent algorithms can typically jump over isolated points where the gradient is not defined (usually some rule is selected, such as making the gradient equal to the value to the right or left, possibly at random). At the end of the optimization loop, the convexified values can be rounded to the nearest allowed value (in this example the nearest integer) for programming into the real RNC system.

After the values of the tunable parameters are determined using the automatic searching techniques described herein, the values may be set in vehicles for normal operations. In some examples, the values of the tunable parameters may be installed using wireless communication. That is, instructions for the setting the values may be sent to a vehicle, which in turn, may execute the instructions setting the tunable parameter values for the RNC system in the vehicle.

Figure 7:
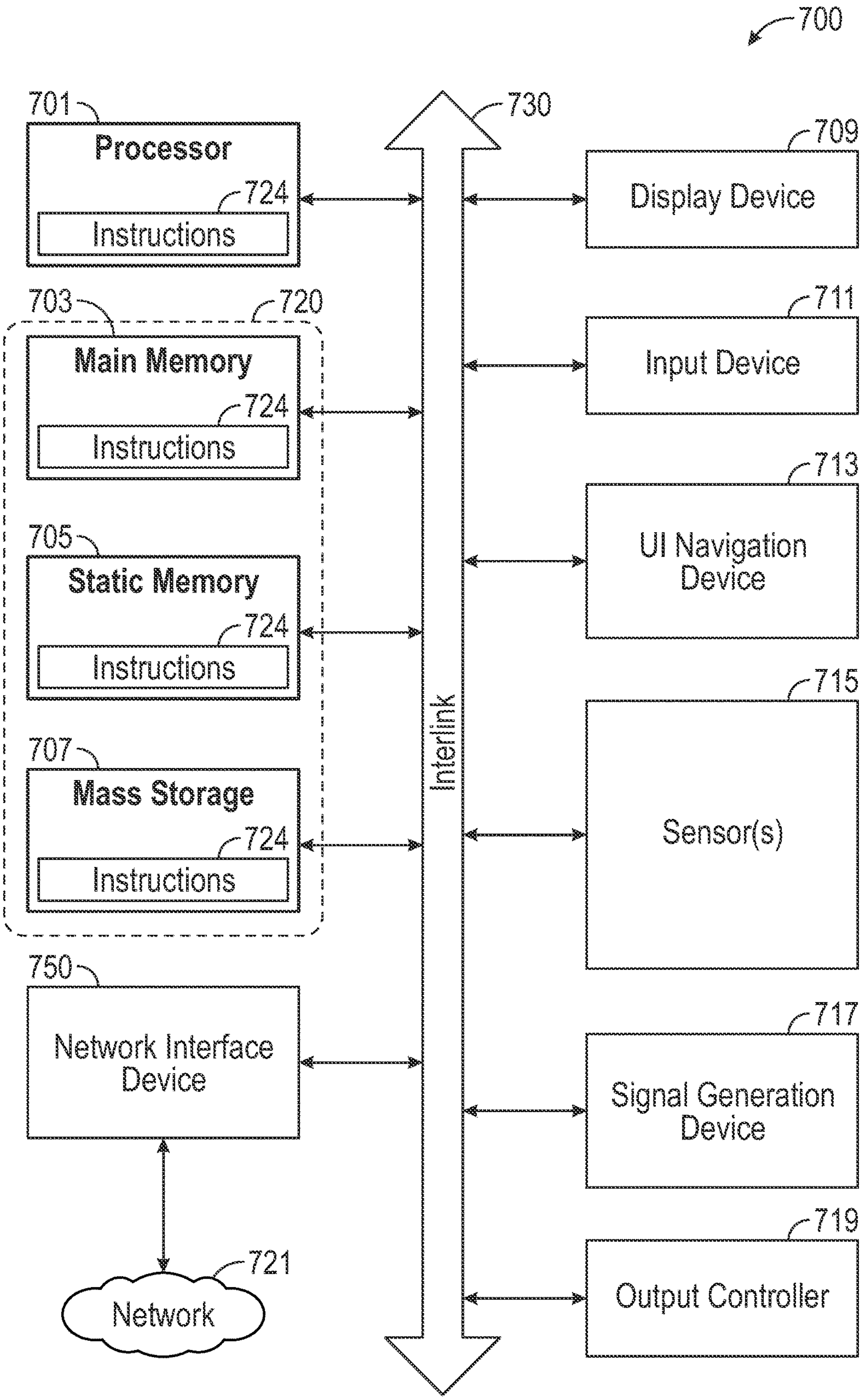
FIG. 7 illustrates a block diagram of an example comprising a machine upon which any one or more of the techniques (e.g., methodologies) discussed herein may be performed.

The techniques shown and described in this document can be performed using a portion or an entirety of parameter tuning framework and system as described above or otherwise using a machine 700 as discussed below in relation to FIG. 7. FIG. 7 illustrates a block diagram of an example comprising a machine 700 upon which any one or more of the techniques (e.g., methodologies) discussed herein may be performed. In various examples, the machine 700 may operate as a standalone device or may be connected (e.g., networked) to other machines.

In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a vehicle head-unit/infotainment system, a vehicle electronic control unit (ECU), a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer-readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine 700 (e.g., computer system) may include a hardware-based processor 701 (e.g., a central processing unit (CPU), a graphics processing unit (GPU), a hardware processor core, or any combination thereof), a main memory 703 and a static memory 705, some or all of which may communicate with each other via an interlink 730 (e.g., a bus). The machine 700 may further include a display device 709, an input device 711 (e.g., an alphanumeric keyboard), and a user interface (UI) navigation device 713 (e.g., a mouse). In an example, the display device 709, the input device 711, and the UI navigation device 713 may comprise at least portions of a touch screen display. The machine 700 may additionally include a storage device 720 (e.g., a drive unit), a signal generation device 717 (e.g., a speaker), a network interface device 750, and one or more sensors 715, such as a global positioning system (GPS) sensor, compass, accelerometer, or other sensor. The machine 700 may include an output controller 719, such as a serial controller or interface (e.g., a universal serial bus (USB)), a parallel controller or interface, or other wired or wireless (e.g., infrared (IR) controllers or interfaces, near field communication (NFC), etc., coupled to communicate or control one or more peripheral devices (e.g., a printer, a card reader, etc.).

The storage device 720 may include a machine readable medium on which is stored one or more sets of data structures or instructions 724 (e.g., software or firmware) embodying or utilized by any one or more of the techniques or functions described herein. The instructions 724 may also reside, completely or at least partially, within a main memory 703, within a static memory 705, within a mass storage device 707, or within the hardware-based processor 701 during execution thereof by the machine 700. In an example, one or any combination of the hardware-based processor 701, the main memory 703, the static memory 705, or the storage device 720 may constitute machine readable media.

While the machine readable medium is considered as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 724 may further be transmitted or received over a communications network 721 using a transmission medium via the network interface device 750 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., the Institute of Electrical and Electronics Engineers (IEEE) 802.22 family of standards known as Wi-Fi®, the IEEE 802.26 family of standards known as WiMax®), the IEEE 802.27.4 family of standards, peer-to-peer (P2P) networks, among others. In an example, the network interface device 750 may include one or more physical jacks (e.g., Ethernet, coaxial, or phone jacks) or one or more antennas to connect to the communications network 721. In an example, the network interface device 750 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Various Notes

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific implementations in which the invention can be practiced. These implementations are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in an aspect are still deemed to fall within the scope of that aspect. Moreover, in the following aspects, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other implementations can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the aspects. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed implementation. Thus, the following aspects are hereby incorporated into the Detailed Description as examples or implementations, with each aspect standing on its own as a separate implementation, and it is contemplated that such implementations can be combined with each other in various combinations or permutations.

The invention claimed is:

1. A method to automatically set tunable parameter values of a road noise cancellation system, the method comprising:
- providing a software simulation of the road noise cancellation system, the road noise cancellation system including a plurality of tunable parameters;
- receiving one or more recorded logs representing one or more different driving conditions of a test vehicle;
- setting a first set of values for the plurality of tunable parameters;
- simulating the road noise cancellation system using the software simulation based on the one or more recorded logs and the first set of values for the plurality of tunable parameters to generate simulation results;
- concurrently generating respective gradients of a set of quantitative measures of quality with respect to the plurality of tunable parameters based on the simulation results, wherein the gradients are generated using auto-differentiation machine learning libraries; and
- setting a second set of values for the plurality of tunable parameters based on the simulation results.

2. The method of claim 1, wherein the one or more recorded logs includes reference data from reference sensors positioned on the test vehicle and disturbance data from error microphones positioned inside the test vehicle.

3. The method of claim 1, wherein the software simulation includes a Filtered-Reference Least Mean Squared (FxLMS) algorithm and acoustic parameters of a vehicle cabin.

4. The method of claim 1, wherein the plurality of tunable parameters includes a step size.

5. The method of claim 1, further comprising:
- storing the second set of values for the tunable parameters;
- configuring the road noise cancellation system onboard in a vehicle with the second set of values for the tunable parameters;
- operating the road noise cancellation system in the vehicle with the configured second set of values for the tunable parameters to generate an anti-noise signal.

6. A system to automatically set tunable parameter values of a road noise cancellation system, the system comprising:
- one or more processors of a machine; and
- a memory storing instructions that, when executed by the one or more processors, cause the machine to perform operations:
- providing a software simulation of the road noise cancellation system, the road noise cancellation system including a plurality of tunable parameters;
- receiving one or more recorded logs representing one or more different driving conditions of a test vehicle;

setting a first set of values for the plurality of tunable parameters;

simulating the road noise cancellation system using the software simulation based on the one or more recorded logs and the first set of values for the plurality of tunable parameters to generate simulation results;

concurrently generating respective gradients of a set of quantitative measures of quality with respect to the plurality of tunable parameters based on the simulation results, wherein the gradients are generated using auto-differentiation machine learning libraries; and setting a second set of values for the plurality of tunable parameters based on the simulation results.

7. The system of claim 6, wherein the one or more recorded logs includes reference data from reference sensors positioned on the test vehicle and disturbance data from error microphones positioned inside the test vehicle.

8. The system of claim 6, wherein the software simulation includes a Filtered-Reference Least Mean Squared (FxLMS) algorithm and acoustic parameters of a vehicle cabin.

9. The system of claim 6, wherein the plurality of tunable parameters includes a step size.

10. The system of claim 6, the operations further comprising:

storing the second set of values for the tunable parameters;

configuring the road noise cancellation system onboard in a vehicle with the second set of values for the tunable parameters;

operating the road noise cancellation system in the vehicle with the configured second set of values for the tunable parameters to generate an anti-noise signal.

11. A machine-readable storage medium embodying instructions that, when executed by a machine, cause the machine to perform operations:

providing a software simulation of a road noise cancellation system, the road noise cancellation system including a plurality of tunable parameters;

receiving one or more recorded logs representing one or more different driving conditions of a test vehicle;

setting a first set of values for the plurality of tunable parameters;

simulating the road noise cancellation system using the software simulation based on the one or more recorded logs and the first set of values for the plurality of tunable parameters to generate simulation results;

concurrently generating respective gradients of a set of quantitative measures of quality with respect to the plurality of tunable parameters based on the simulation results, wherein the gradients are generated using auto-differentiation machine learning libraries; and setting a second set of values for the plurality of tunable parameters based on the simulation results.

12. The machine-readable storage medium of claim 11, wherein the one or more recorded logs includes reference data from reference sensors positioned on the test vehicle and disturbance data from error microphones positioned inside the test vehicle.

13. The machine-readable storage medium of claim 11, wherein the software simulation includes a Filtered-Reference Least Mean Squared (FxLMS) algorithm and acoustic parameters of a vehicle cabin.

14. The machine-readable storage medium of claim 11, wherein the plurality of tunable parameters includes a step size.

15. The machine-readable storage medium of claim 11, further comprising:

storing the second set of values for the tunable parameters;

configuring the road noise cancellation system onboard in a vehicle with the second set of values for the tunable parameters;

operating the road noise cancellation system in the vehicle with the configured second set of values for the tunable parameters to generate an anti-noise signal.

* * * * *